(12) United States Patent
Yajima et al.

(10) Patent No.: US 7,239,813 B2
(45) Date of Patent: Jul. 3, 2007

(54) BIT SYNCHRONIZATION CIRCUIT AND CENTRAL TERMINAL FOR PON SYSTEMS

(75) Inventors: Yusuke Yajima, Fujisawa (JP); Toshihiro Ashi, Yokohama (JP); Tohru Kazawa, Kokubunji (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 729 days.

(21) Appl. No.: 10/654,613

(22) Filed: Sep. 4, 2003

(65) Prior Publication Data

US 2004/0258410 A1 Dec. 23, 2004

(30) Foreign Application Priority Data

Jun. 17, 2003 (JP) .............................. 2003-171680

(51) Int. Cl.
*H04B 10/00* (2006.01)

(52) U.S. Cl. .................... 398/154; 398/100; 398/58; 398/66; 398/70; 398/71; 370/362; 370/373; 370/240.28; 370/520; 370/514; 370/516; 370/528; 375/354; 375/355; 375/357; 375/359; 375/360; 375/362; 375/363; 375/368; 375/367; 375/375; 375/371; 375/287; 375/293

(58) Field of Classification Search ................ 398/371, 398/287, 293, 154, 58, 66, 70–71, 100; 359/158; 370/362, 373, 240.28, 520, 514, 516, 528; 375/354–355, 357, 359, 360, 362, 363, 368, 375/367, 375, 371, 287, 293

See application file for complete search history.

(56) References Cited

U.S. PATENT DOCUMENTS 5,657,318 A * 8/1997 Ohmori et al. ............. 370/516

6,278,755 B1 * 8/2001 Baba et al. ................. 375/360

FOREIGN PATENT DOCUMENTS

| JP | 05-211498 | 8/1993 |
|----|-----------|--------|
| JP | 07-193562 | 7/1995 |
| JP | 09-36849 | 2/1997 |
| JP | 09-162853 | 6/1997 |
| JP | 09-181713 | 7/1997 |
| JP | 10-247903 | 9/1998 |
| JP | 10-327159 | 12/1998 |
| JP | 11-308204 | 11/1999 |
| JP | P2002-51035 A | 2/2002 |

* cited by examiner

OTHER PUBLICATIONS

ITU-T Recommendation G.983.1, "Broadband Otpical Access System Based on Passive Optical Networks (PON)" COM Oct. 15, 1998 Original: English, pp. 1-426.

*Primary Examiner*—Kenneth Vanderpuye
*Assistant Examiner*—Guerssy Azemar
(74) *Attorney, Agent, or Firm*—McDermott Will & Emery LLP

(57) ABSTRACT

A bit synchronization circuit composed of a multiphase data sampling unit for converting each received burst data sets to multiphase data trains, a phase determination unit for generating a control signal indicating an optimum phase data train, an output data selector for selectively passing optimum phase data train indicated by the control signal, and a data synchronization unit for converting the optimum phase data train to a data train in synchronization with a reference clock. The phase determination unit repeatedly detecting the optimum phase data train during the same burst data set is received. When optimum phase varies, the output data selector dynamically switches the optimum phase data train to be supplied to the data synchronization unit.

4 Claims, 14 Drawing Sheets

OPTIMUM-PHASE-CLOCK SELECTION TYPE
BIT SYNCHRONIZING CIRCUIT 40A

OPTIMUM-PHASE-DATA SELECTION TYPE
BIT SYNCHRONIZING CIRCUIT 40B

SUBSCRIBER LINE INTERFACE 2-i

INTEGRATION UNIT 520

MASK SIGNAL GENERATOR 54

BIT SYNCHRONIZATION CIRCUIT AND CENTRAL TERMINAL FOR PON SYSTEMS

BACKGROUND OF THE INVENTION (1) Field of the Invention

The present invention relates to a bit synchronization circuit and a transmission system each for converting high speed burst signals to data trains in synchronization with a reference clock and, more particularly, to a bit synchronization circuit and a central terminal for a PON system each having an excellent phase variation tracking ability for high speed burst signals.

(2) Description of the Related Art

As an example of a transmission system for relaying burst signals transmitted from a plurality of terminal apparatus, there can be listed a PON system defined in ITU-T Recommendation G.983. 1 "Broadband Optical Access Systems based on Passive Optical Network (PON)" (Non-Patent Document 1). As shown in FIG. 2, the PON system is a point-to-multipoint optical transmission system having a structure in which each of optical fibers 11 (11-1 to 11-$m$) to be accommodated to a central terminals OLT (Optical Line Terminals) 1 (1A or 1B) is branched with an optical coupler (star coupler) 12 to a plurality of tributary optical fibers 13 (13-1 to 13-$m$) and remote terminals ONU (Optical Network Units) 10 (10-1 to 10-$n$) are connected to the individual tributary optical fibers.

In a PON section, a 53-byte ATM cell, e.g., is used for downstream data transmission from the central terminal 1 to each of the remote terminals 10 and a 56-byte cell obtained by adding a 3-byte overhead to the ATM cell, e.g., is used for upstream data transmission from the remote terminal 10 to the central terminal 1. The central terminal 1 generates downstream communication frames each with a frequency f0 in synchronization with a reference clock in the central terminal or with a multiple of the frequency f0. Each of the downstream communication frames has a transmission speed of, e.g., 622.08 Mbit/s and is composed of 224 consecutive cells. A control cell is inserted with a frequency of one control cell for every 27 cells. The control cell in the PON section is termed a PLOAM cell.

On the other hand, each of upstream communication frames has a transmission speed of about 100 Mbit/s to 155.52 Mbit/s, which is lower than the transmission speed of the downstream communication frame. For example, an upstream frame at 155.52 Mbit/s is composed of 53 cells and, as shown in FIG. 3, transfer cells B (B1-1, B1-2, ..., Bn-1, Bn-2, ...) from the plurality of remote terminals 10-1 to 10-$n$ are time-division multiplexed on the optical fiber 11-1.

Each of the remote terminals 10 extracts the reference clock from the downstream frame and transmits a cell (burst data set) B composed of a 3-byte overhead OH and a 53-byte payload (ATM cell portion) PLD to have a 56-byte length with a frequency f0 in synchronization with the reference clock. The transmission of the cell B is performed within a burst period (hereinafter referred to as the burst slot) Tb which is specified in the PLOAM cells by the central terminal 1 to each of the remote terminals 10. The period Tb of each the burst slots is on the order of several microseconds. The overhead OH is composed of a guard time GT with no signal, a preamble PR, and a delimiter DTL.

Since the length of the segment of the tributary optical fiber 13 branched from the optical splitter 12 is not uniform, the upstream cells (burst data sets) transmitted by the individual remote terminals reach the central terminal 1 to have phase differences, which are different from each other, with reference to the reference clock. Accordingly, the central terminal 1 is required to establish, upon reception of each burst data set, bit synchronization within the period during which the preamble PR composed of a series of alternating "1" and "0" bits is received, identify the leading portion of the payload by the subsequent delimiter DL, and perform a receiving process for the ATM cell.

As typical circuit technologies for the bit synchronization mentioned above, there have been known, e.g., a timing clock extracting method (Prior Art 1) which extracts a timing clock from received data by using a timing extracting circuit composed of a PLL (Phase Locked Loop) and a surface acoustic wave (SAW) filter and latches the received data based on the clock, an optimum phase clock selecting method (Prior Art 2) which preliminarily generates a plurality of internal clocks having different phases from a reference clock and performs a receiving process for that one of the internal clocks having a phase with the highest margin over the phase of received data, and an optimum phase data selecting method (Prior Art 3) which generates a plurality of data trains having different phases from received data and selecting that one of the data trains having the highest phase margin over a reference clock.

The bit synchronization circuit of the optimum phase clock selecting type (Prior Art 2) is shown by way of example in FIG. 4, which is composed of: an n-phase clock generator 41 for generating, from a reference clock CL having the same frequency as the received data, reference clocks having n phases each shifted from the adjacent one by a 1/n period; a multiphase data sampling unit 42 for latching the received data with the n-phase reference clocks and converting the latched received data to n-phase data trains having different phases; a phase determination unit 43 for performing a comparing process between those of the n-phase data trains outputted from the multiphase data sampling unit 42 which have adjacent phases to detect a variation point in the input data and generating a control signal for selecting the optimum phase clock having a phase with the highest margin over the phase of the received data; a clock selection unit 44 for selecting, in response to the control signal, the optimum phase clock from among the n-phase reference clocks; and a FIFO buffer 45 for temporarily storing the received data. The bit synchronization circuit is designed to write the received data in the FIFO buffer 45 in accordance with the optimum phase clock and read out the written data therefrom in accordance with the reference clock CL.

Examples of the foregoing bit synchronization circuit of optimum phase clock selecting type are disclosed in, e.g., Japanese Laid-Open Patent Publication No. 7-193562 (Patent Document 1), Japanese Laid-Open Patent Publication No. 9-181713 (Patent Document 2), Japanese Laid-Open Patent Publication No. 10-247903 (Patent Document 3), and Japanese Laid-Open Patent Publication No. 11-308204 (Patent Document 4).

The bit synchronization circuit of optimum phase data selecting type (Prior Art 3) is shown by way of example in FIG. 5, which is composed of: a multiphase data sampling unit 46 for converting received data to n-phase data trains each shifted in phase from the adjacent one by the 1/n period of a reference clock CL; a phase determination unit 47 for performing a comparing process between those of the n-phase data trains outputted from the multiphase data sampling unit 46 which have adjacent phases to detect a variation point in the input data and generating a control signal for selecting the optimum phase data train having the highest phase margin over the reference clock CL; an output data selection unit 48 for selectively outputting the optimum phase data train indicated by the control signal from among the n-phase data trains outputted from the multiphase data sampling unit 46; and an output data synchronization unit 49 for latching output data from the output data selection unit 48 in synchronization with the reference clock CL and outputting the latched data as a retimed data train.

Examples of the foregoing bit synchronization circuit of optimum phase data selecting type are disclosed in, e.g., Japanese Laid-Open Patent Publication No. 9-162853 (Patent Document 5) and Japanese Laid-Open Patent Publication No. 9-36849 (Patent Document 6).

Since the optical signal received by the central terminal 1 in the PON system attenuates while passing through the optical fiber and the level of the received optical signal is different from one transmitter (remote terminal) from another, a signal identification threshold is controlled variably on a per burst-data-set basis depending on the received light level of the preamble PR by using the ATC (Automatic Threshold Control) function of an O/E signal converter. As shown in FIG. 6, e.g., the optical signal of the preamble PR1 of a burst data set B1 is detected with an offset threshold TH0 and an ATC decision threshold TH1 for the burst data set B1 is set depending on the received light level of the preamble PR1. When the receiving process for the burst data set B1 is completed, the ATC decision threshold is reset to the offset threshold TH0 within the period of the guard time GT for the next burst data set so that the preamble PR2 of the next burst data set B2 is detected with the offset threshold.

In an optical transmission system, the level of an optical signal attenuates while passing through an optical fiber as a signal transmission medium so that an improvement in the responsivity of a unit for receiving the optical signal is required to elongate the distance of optical transmission. To set an optimum ATC decision threshold for a burst data set which is low in received optical power, it is necessary to minimize the value of the offset threshold TH0 which is set in the period of the guard time GT. As the offset threshold TH0 is reduced increasingly, however, an O/E signal converter becomes more sensitive to noise. As a result, an erroneous signal may be inputted to a bit synchronization circuit to cause the misoperation thereof.

To solve the problem, a method in which data received by a bit synchronization circuit is forcibly fixed to a logic value "0" by using a mask signal for a given period from the resetting of the ATC decision threshold till the reception of the next burst data set is proposed in, e.g., Japanese Laid-Open Patent Publication No. 10-327159 (Patent Document 7).

With an increase in the amount of traffic over a communication network, a PON system used for an access network is also required to be increased in transmission speed so that the standardization of a PON system having a transmission speed increased from the conventional 100 Mbit/s order to a Gbit/s class (hereinafter referred to as the G-PONs) has been promoted in, e.g., the ITU-T Recommendation G.984 or the IEEE Recommendation 802.3ah. In the G-PONs, an upstream data set transmitted from the remote terminal 10 to the central terminal 1 is composed of a variable-length burst data set, instead of a conventional fixed-length burst data set (ATM cell). Accordingly, the maximum burst length thereof may be elongated to about 1 ms, which is far larger than conventional several microseconds.

In the case of designing a bit synchronization circuit for a central terminal in the G-PON system having a higher transmission speed, however, the timing clock extracting method (Prior Art 1) which essentially takes a long time for clock extraction requires a long preamble segment for each of burst data sets, so that the transmission speed is lowered effectively. In the G-PON system, therefore, the optimum phase clock selecting method (Prior Art 2) or the optimum phase data selecting method (Prior Art 3) capable of achieving higher-speed bit synchronization is promising.

To enhance system flexibility in the G-PON system, it is necessary to give consideration to a system configuration in which data frequencies in upstream and downstream directions are asynchronous. It is also necessary to give consideration to a system configuration in which a data transfer speed in an upstream direction differs from one remote terminal to another, e.g., a system configuration in which burst data sets received from the individual remote terminals have varied frequencies f1 to fn relative to the reference clock frequency f0 of the central terminal 1.

In the conventional bit synchronization circuit of optimum phase clock selecting type or optimum phase data selecting type, once the optimum phase is determined during the period during which the preamble is received, the bit synchronization for the received data is performed without changing the optimum phase clock or the optimum phase data during the period during which the burst data set is received.

In the case of using the optimum phase clock selecting method or the optimum phase data selecting method in the G-PON bit synchronization circuit in which the burst data set has an increased length, however, there is a possibility that the optimum phase clock or the optimum phase data determined in the preamble region may come out of the optimum phase due to a phase variation or frequency asynchronization occurring in the payload region. In this case, retiming data based on the optimum phase clock or the optimum phase data determined in the preamble region becomes unstable and a bit error occurs in output data. Therefore, the bit synchronization circuit for the G-PON system is required to have a phase tracking ability over the entire region of the received burst data set.

In accordance with the optimum phase clock selecting method, however, it is not easy to control timing for clock switching in the payload region and suppress noise occurring upon the clock switching. On the other hand, the optimum phase data selecting method has a problem that, when the phase of the received data has varied by one period or more relative to the reference clock, data continuity is disturbed by the missing or overlapping of data upon the switching to the optimum phase data, which will be described later.

SUMMARY OF THE INVENTION

It is therefore an object of the present invention to provide a bit synchronization circuit and a central terminal for a PON system each capable of dynamic switching to an optimum phase even during the period a burst data set is received.

Another object of the present invention is to provide a bit synchronization circuit and a central terminal for a PON system each capable of tracking an optimum phase over the entire region of a received burst data set.

Still another object of the present invention is to provide a bit synchronization circuit and a central terminal for a PON system each capable of correcting a disturbance in data continuity occurring in the process of tracking an optimum phase during the reception of a burst data set.

To attain the foregoing objects, a bit synchronization circuit according to the present invention comprises: a multiphase data sampling unit for converting each of received burst data sets to multiphase data trains having phases different from each other; a phase determination unit for detecting, from among the multiphase data trains, an optimum phase data train having the highest phase margin over a reference clock and generating a control signal indicating the optimum phase data train; an output data selector for selectively passing, of the multiphase data trains outputted from the data sampling portion, the optimum phase data train indicated by the control signal; and a data synchronization unit for converting the data train passed through the output data selector to a data train in synchronization with the reference clock and outputting the resulting data train, wherein the phase determination unit repeatedly performs the operation of detecting the optimum phase data train during a period during which the same burst data set is received and, if an optimum phase varies, the output data selector dynamically switches the optimum phase data to be supplied to the data synchronization unit in response to the control signal outputted from the phase determination unit.

To be more specific, the phase determination unit has, e.g., first means for detecting the optimum phase data train in each cycle of the reference clock and second means for cumulatively summing the number of times the optimum phase data train is detected by the first means for each of the different phases and generating, regarding the phase for which the cumulative sum reaches a reference value as the optimum phase, a control signal indicating the optimum phase data train, the second means clearing the number of detections for each of the different phases on every determination of the optimum phase and repeating the cumulative summation of the number of detections for each of the different phases.

If a first optimum phase in each of the burst data sets is determined based on a first cumulative reference value and the optimum phase is determined thereafter based on a second cumulative reference value different from the first cumulative reference value, more prompt establishment of bit synchronization and stabilized bit synchronization in a burst section are achievable.

One feature of the present invention is that the bit synchronization circuit further comprises: means for correcting a disturbance in data continuity occurring in the output data train from the output data selector upon the dynamic switching of the optimum phase data train.

In one aspect of the present invention, the bit synchronization further comprises, for the correction of a disturbance in data continuity occurring in the output data train: means for generating a missing data supplying data train from the most-delayed-phase data train outputted from the multiphase data sampling unit and supplying, to the data synchronization unit, the missing data supplying data train in parallel relation with the optimum phase data train, wherein the phase determination unit has means for detecting a phase variation under a specified condition which disturbs continuity of the optimum phase data and generating a data train correction signal, and the data synchronization unit comprises data transfer control means for selecting, in response to the data train correction signal, data to be transferred as the output data train from between the optimum phase data train and the missing data supplying data train.

The means for generating the data train correction signal detects that, e.g., the optimum phase has changed from a most delayed phase to a most advanced phase to generate a first control signal as the data train correction signal and detects that, e.g., the optimum phase has changed from the most advanced phase to the most delayed phase to generate a second control signal as the data train correction signal. In this case, the data transfer control means deletes, from the optimum phase data train, data supplied upon the generation of the first control signal and performs an operation of selecting the data such that missing data supplying data supplied upon the generation of the second control signal is inserted compensatorily immediately before the optimum phase data supplied upon the generation of the second control signal.

The present invention provides a central terminal for an optical transmission system, the central terminal accommodating at least one optical fiber and being connected to a plurality of remote terminals via a plurality of tributary optical fibers branched from the optical fiber with an optical coupler. Each of subscriber line interfaces connected to the individual optical fibers includes an O/E converter for converting an optical signal received from the optical fiber to an electric signal, and the bit synchronization circuit described above connected to the O/E converter.

Another feature of the present invention is that the O/E converter has an automatic threshold control (ATC) function of setting a variable threshold for identifying the optical signal for each of received burst data sets, resetting the threshold to an offset value within a no-signal segment generated between the individual burst data sets, and awaiting the optical signal for the subsequent burst data set, the bit synchronization circuit has means for generating a mask signal for initiating a mask period in response to a threshold reset signal supplied from the O/E converter and terminating the mask period after the variable threshold for identifying the optical signal for the subsequent burst data set is determined, and the second means of the phase determination unit halts, during the mask period indicated by the mask signal, the operation of cumulatively summing the number of detections for each of the different phases and maintains a state in which the number of detections is cleared.

Other features and operations of the present invention will become apparent from the description of the following embodiments which will be given with reference to the drawings.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 7:
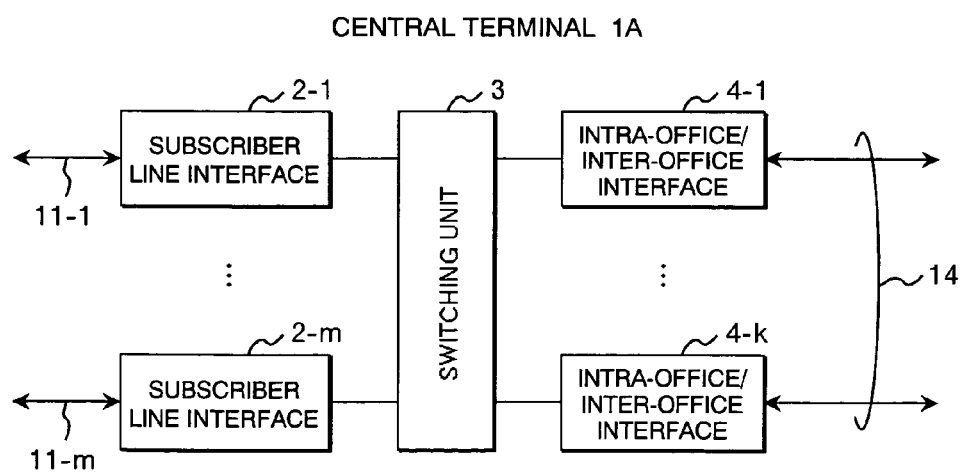
FIG. 7 is a view showing a structure of a PON central terminal to which the bit synchronization circuit according to the present invention is applied.

FIG. 7 shows a structure of a central terminal 1A for a G-PON system to which a bit synchronization circuit according to the present invention is applied.

The central terminal 1A is composed of: a single or plurality of subscriber line interfaces 2 (2-1 to 2-m) connected to optical fibers 11 (11-1 to 11-m) in a PON section; a single or plurality of intra-office/inter-office interfaces 4 (4-1 to 4-k) connected to a core network 14; and a switching unit 3 for exchanging data between these interfaces.

Figure 8:
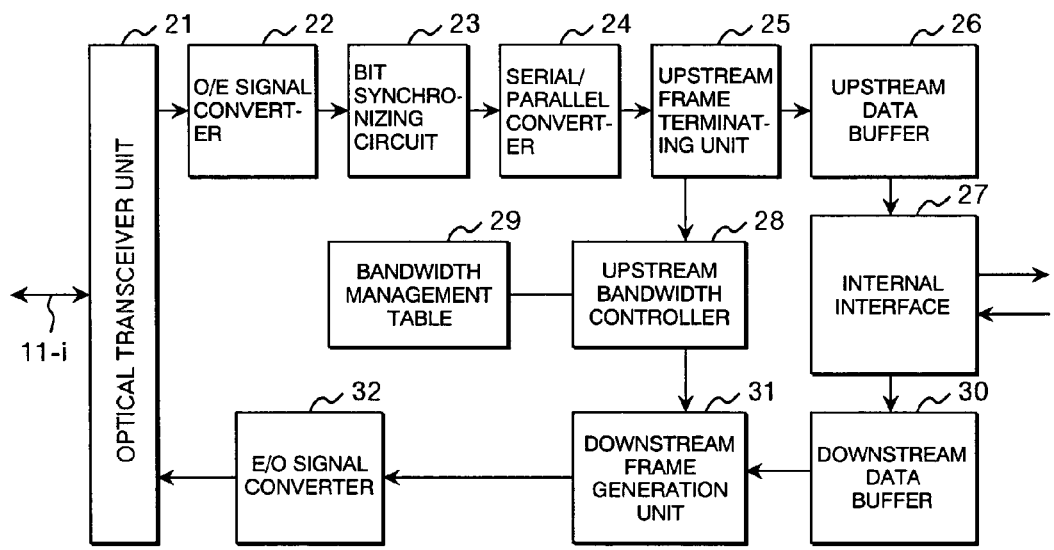
FIG. 8 is a view showing an embodiment of a subscriber line interface in the PON central terminal.

FIG. 8 shows an embodiment of the subscriber line interface 2-i (i=1 to m). The subscriber line interface 2-i has: an optical transceiver unit 21 connected to the optical fiber 11-i; an O/E signal converter 22 for converting an upstream optical signal received at the optical transceiver unit 21 to an electric signal; a bit synchronization circuit 23 connected to the O/E signal converter 22; a serial/parallel converter 24 for converting bit signals outputted serially from the bit synchronization circuit 23 to parallel data sets each composed of a specified number of bits; an upstream frame terminating unit 25 for identifying output data sets from the serial/parallel converter 24, performing a terminating process for an upstream frame, and storing user data contained in the upstream frame in an upstream data buffer 26; and an internal interface 27 for reading out the data stored in the upstream data buffer 26 at an internal transmission speed, performing format conversion with respect thereto if necessary, and transfers the data to the switching unit 3.

The upstream frame terminating unit 25 extracts, from the upstream frame, notification information (cue information) indicative of a situation in which transmission data is stored in each of the remote terminals and transfers the notification information to an upstream bandwidth controller 28. The upstream bandwidth controller 28 calculates a bandwidth in the upstream direction to be allocated to each of the remote terminals based on bandwidth setting information preliminarily specified by a manager and on the cue information of which the stream bandwidth controller 28 has been notified by the upstream frame terminating unit 25 and periodically updates the content of a bandwidth management table 29.

A downstream user data set distributed by the switching unit 3 to the subscriber line interface 2-i is inputted from the internal interface 27 to a downstream data buffer 30, temporarily stored therein, and then read out by a downstream frame generation unit 31. The downstream frame generation unit 31 imparts monitoring control data to a group of user data sets read out from the downstream data buffer 30 to generate a downstream frame and output it to the E/O signal converter 32. The downstream frame converted to an optical signal is transmitted to the optical fiber 11-i via the optical transceiver unit 21.

Figure 1:
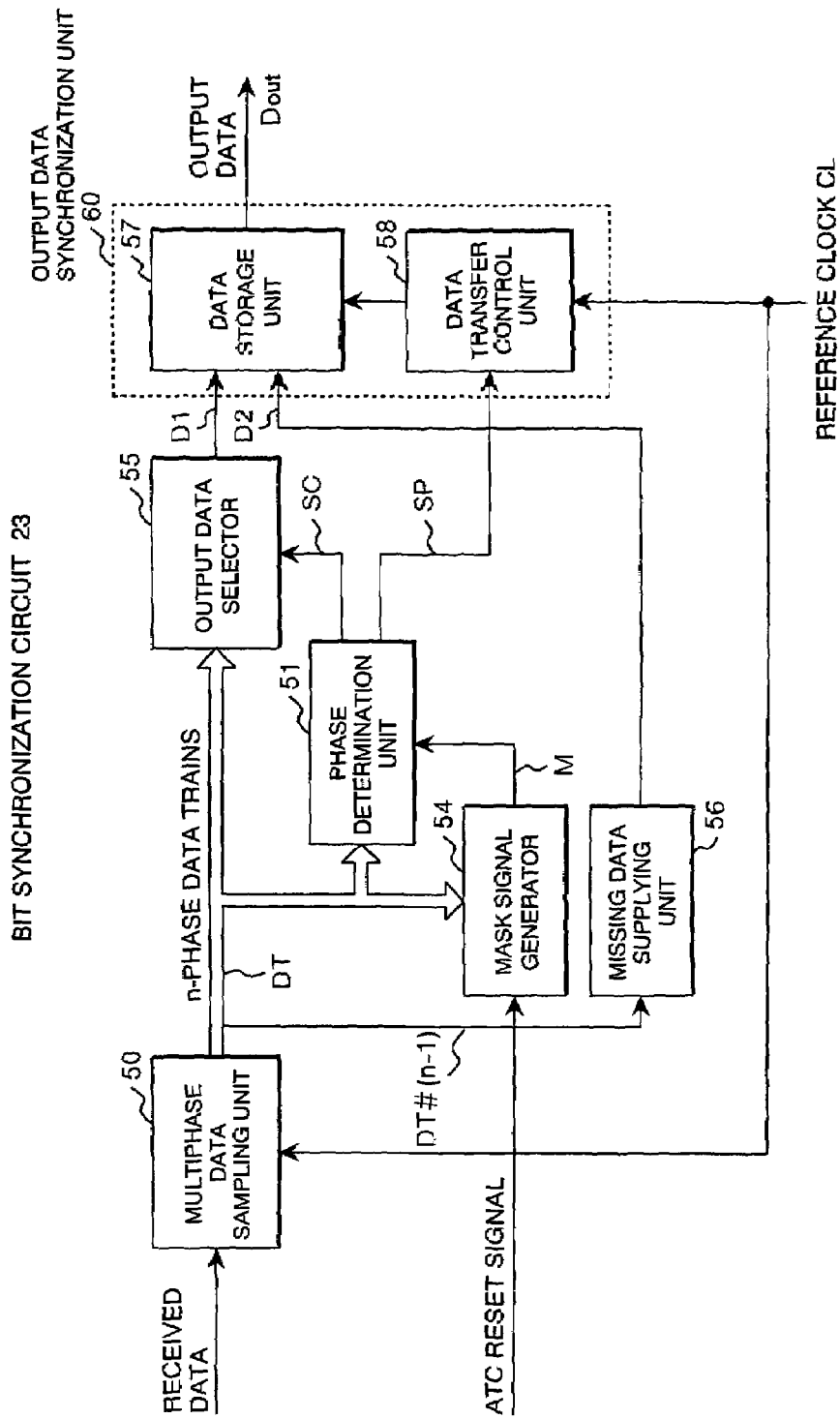
FIG. 1 is a view showing a structure of a bit synchronization circuit according to the present invention.
Figure 2:
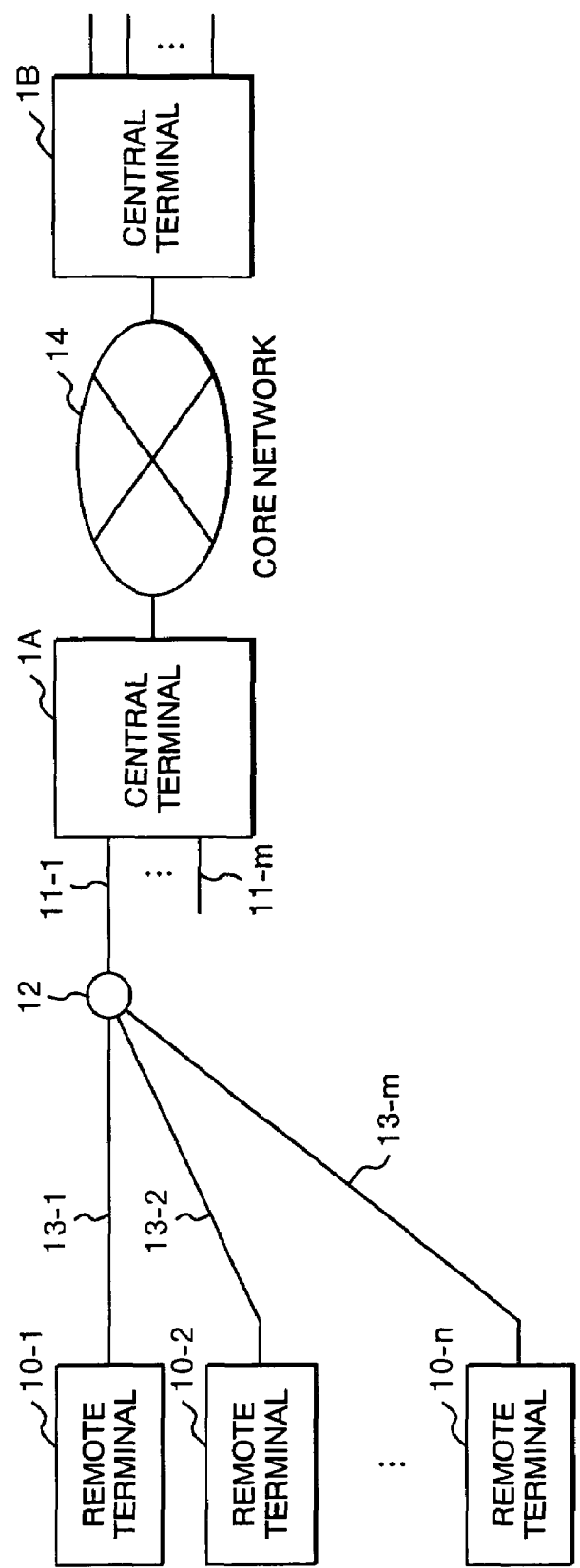
FIG. 2 is a view showing a network structure of a PON system to which the present invention is applied.
Figure 3:
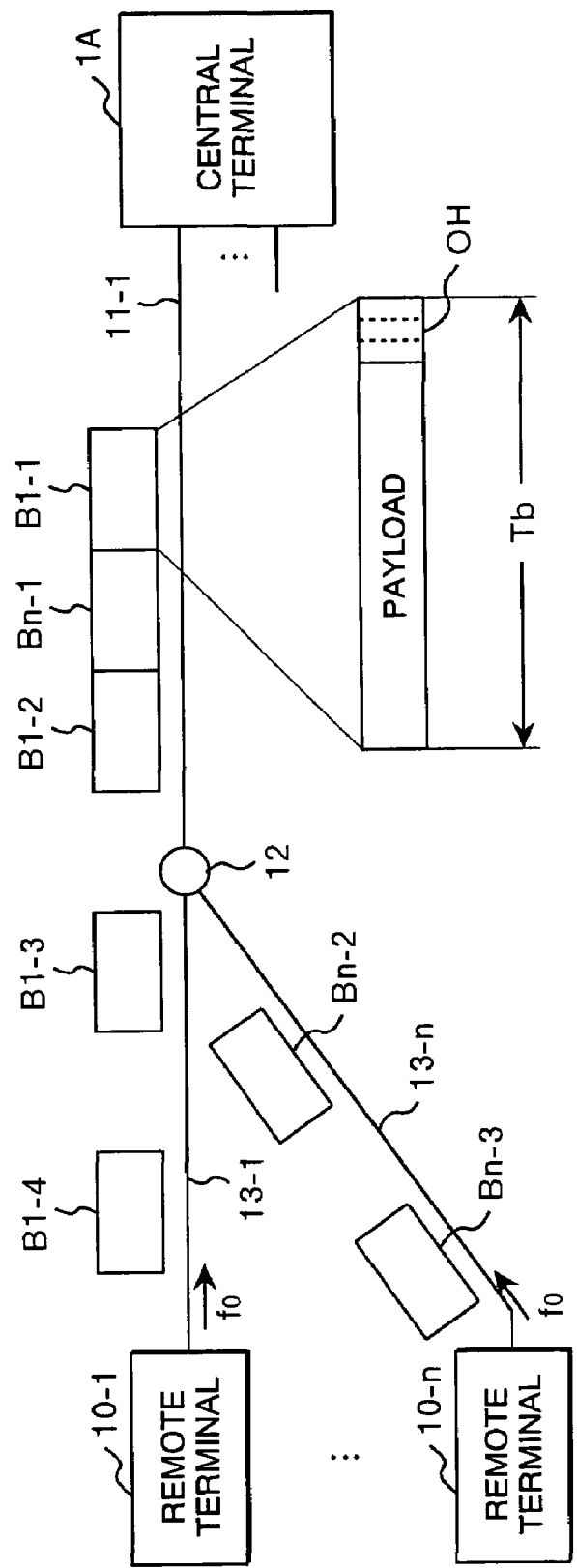
FIG. 3 is a view for illustrating upstream data transmission in a PON section.
Figure 4:
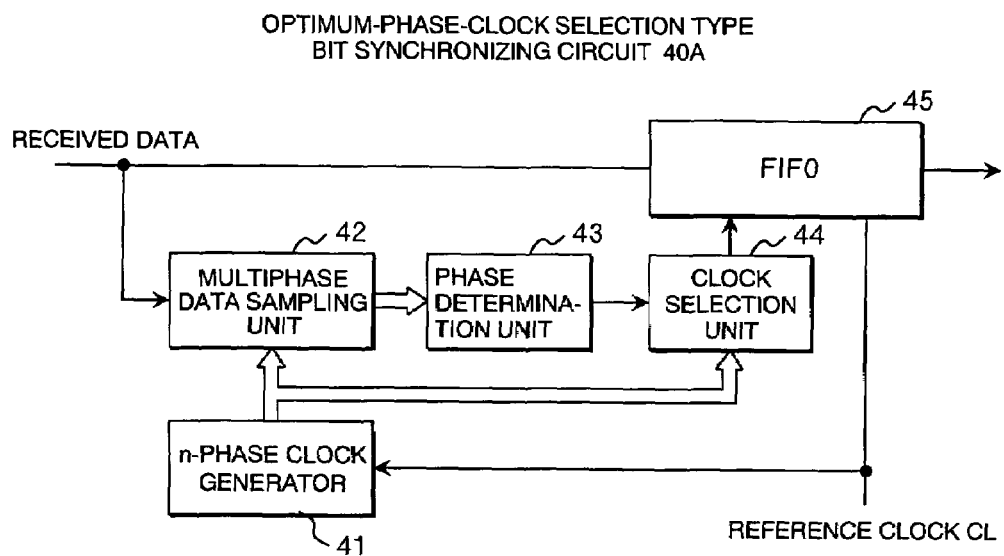
FIG. 4 is a view showing a basic structure of a conventional bit synchronization circuit in accordance with an optimum phase clock selecting method.
Figure 5:
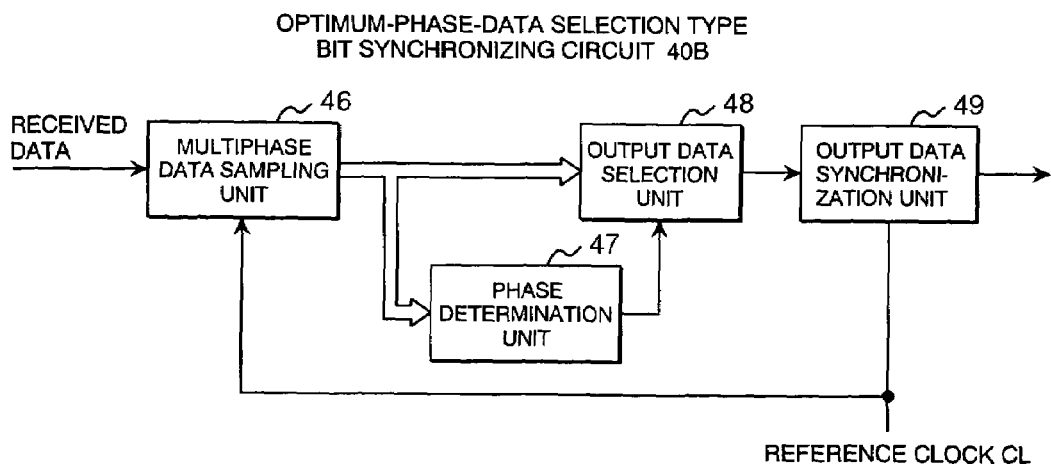
FIG. 5 is a view showing a basic structure of a conventional bit synchronization circuit in accordance with an optimum phase data selecting method.
Figure 6:
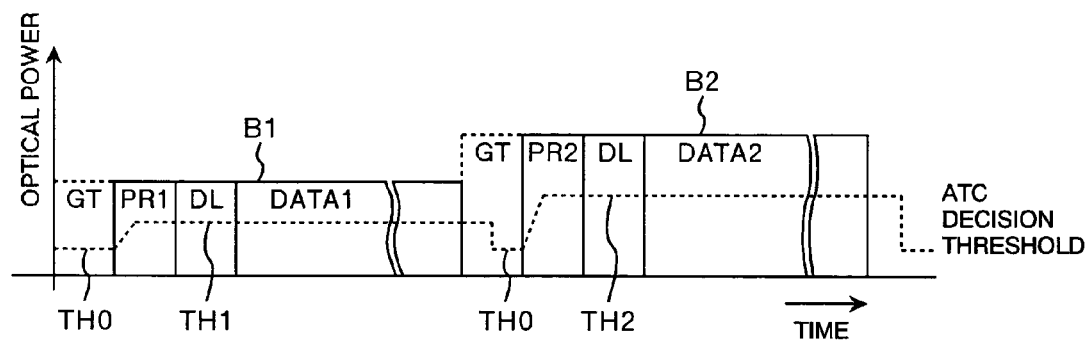
FIG. 6 is a view for illustrating automatic threshold control (ATC) in the PON system.

FIG. 1 shows an embodiment of the bit synchronization circuit 23. The bit synchronization circuit 23 according to the present invention has been obtained by improving an optimum phase data selecting method and comprises: a multiphase data sampling unit 50; a phase determination unit 51; an output data selector 55; and an output data synchronization unit 60.

The multiphase data sampling unit 50 converts a received signal (received data) outputted serially from the O/E signal converter 22 to an n-phase data trains DT (DT#0 to DT#n-1). The foregoing n-phase data trains DT (DT#0 to DT#n-1) are outputted to have respective phases in matching relation with the phase φ0 of a reference clock CL. In terms of the contents, the n-phase data trains DT indicate values obtained by sampling the received data with timings generated by stepwise shifting the reference clock by 1/n periods. Specifically, the multiphase data sampling unit 50 latches the received data with, e.g., n-phase clocks CL#0 to CL#n-1 generated by delaying the reference clock CL, reads out the latched n-phase signals in synchronization with the reference lock CL, and thereby generates the n-phase data trains DT.

In this case, the n-phase clocks CL#0 to CL#n-1 may be generated by dividing, by n, the frequency of a high speed clock which is n-fold the frequency of the received data or the reference clock CL or by dividing, by n/2, the frequency of a clock which is n/2-fold the frequency of the received data by using the rising edge thereof as a trigger and dividing, by n/2, the frequency of the clock by using the falling edge thereof as a trigger. The n-phase clocks CL#0 to CL#n-1 may also be generated by using a voltage control oscillator including a ring oscillator or the like. Instead of using the n-phase clocks, it is also possible to input a received signal sampled with a frequency which is n-fold the frequency of the reference clock to an n-bit shift register and read out data stored at each of bit positions in parallel in each cycle of the reference clock.

The phase determination unit 51 identifies the optimum phase by a variation point in the received signal contained in the foregoing n-phase data trains and generates a switching control signal SC and a data train correction signal SP to be given to the output data synchronization unit 60 based on the optimum phase and on a mask signal M generated from a mask signal generator 54.

The output data synchronization unit 60 is composed of the output data selector 55 and a data transfer control unit 58. The switching control signal SC generated in the phase determination unit 51 is given to the output data selector 55 and the data train correction signal SP is given to the data transfer control unit 58. The output data selector 55 selects, from among the n-phase data trains DT#0 to DT#n-1 outputted from the multiphase sampling unit 50, the optimum phase data train D1 in response to the switching control signal SC and supplies the selected optimum phase data train D1 to a data storage unit 57.

In the present invention, the phase determination unit 51 tracks the optimum phase not only during the period during which the preamble region of each of the burst data sets is received but also during the period during which the subsequent payload region thereof is received and generates the foregoing switching control signal SC and data train correction signal SP suitably.

The present embodiment supplies, of the n-phase data trains DT#0 to DT#n-1 outputted from the multiphase data sampling unit 50, the most-delayed-phase data train DT#n-1 to a missing data supplying unit 56 and supplies, to the data storage unit 57, the data train DT#n-1 as compensatory data D2 for missing data occurring upon the switching of the optimum phase data train in synchronization with the optimum phase data train D1.

The data storage unit 57 has first and second buffer memories for temporarily storing the optimum phase data train D1 and the compensatory data D2 for missing data. The wiring and reading of data in and from these buffer memories is controlled with control signals supplied from the data transfer control unit 58. The data transfer control unit 58 controls the writing and reading of the optimum phase data train D1 in response to the data train correction signal SP, selectively outputs the data read out from the first or second buffer memory to delete overlapping data and compensate for the missing data, and thereby provides an output data train Dout from which the disturbance in the data train caused by the switching of the optimum phase has been eliminated.

Figure 9:
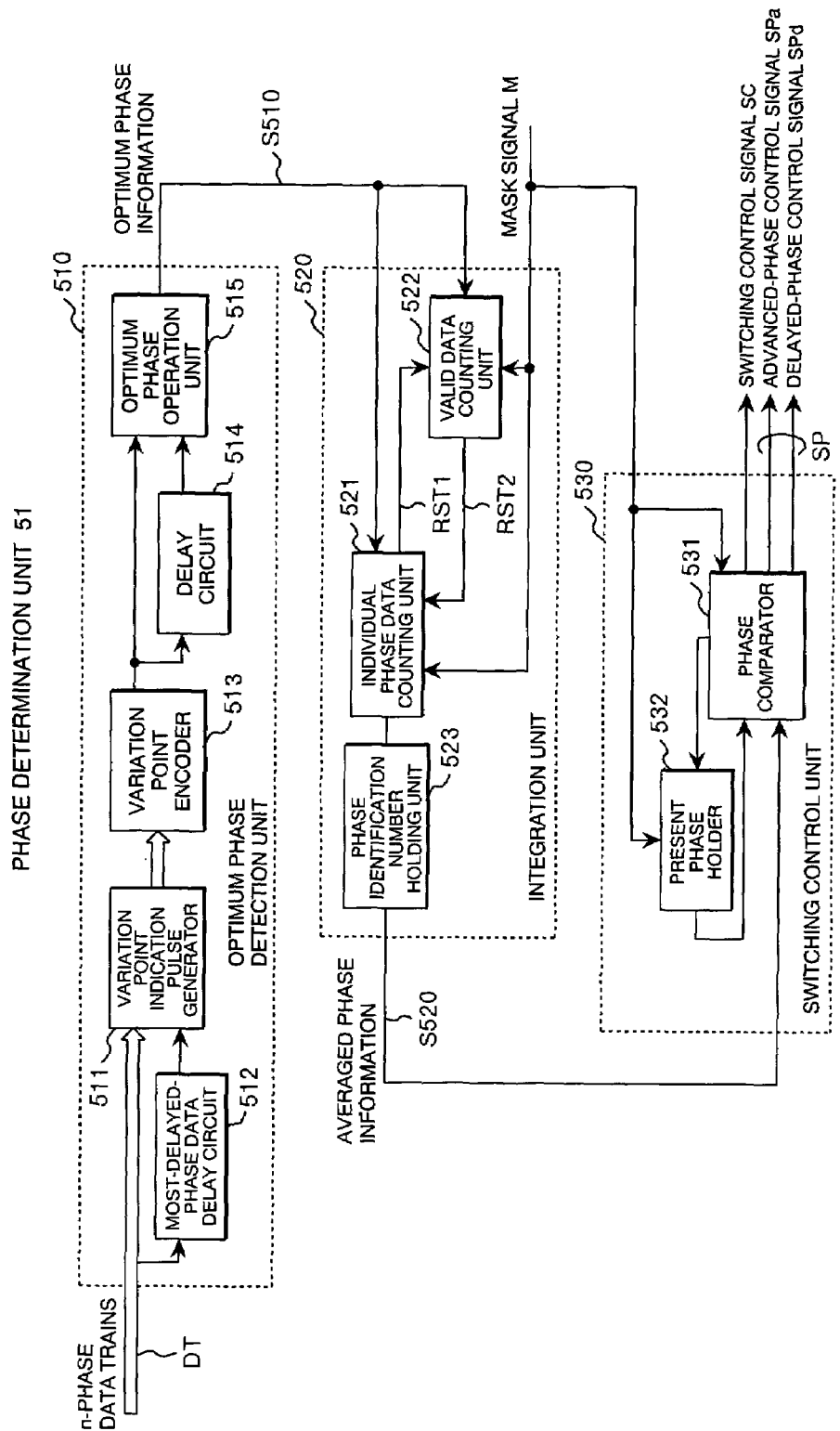
FIG. 9 is a view showing an embodiment of a phase determination unit 51 in the bit synchronization circuit shown in FIG. 1.

FIG. 9 shows an embodiment of the phase determination unit 51. The phase determination unit 51 is composed of: an optimum phase detection unit 510 for detecting, from among the n-phase data trains DT (DT#0 to DT#n-1), the data train having the highest phase margin over the phase $\phi 0$ of the reference clock in each cycle of the reference clock CL to generate optimum phase information indicative of the phase of the data train; an integration unit 520 for cumulatively summing the number of times the optimum phase data train is detected for each of the individual phases over a plurality of cycles, determining the data train for which the cumulative sum reaches a specified reference value as the optimum phase data train, and outputting averaged phase information indicative of the optimum phase data train: and a switching control unit 530 for generating the switching control signal SC and the data train correction signal SP (an advanced-phase control signal SPa and a delayed-phase control signal SPd) based on the averaged phase information and on the mask signal M.

The optimum phase detection unit 510 supplies the n-phase data trains DT#0 to DT#n-1 to a variation point indication pulse generator 511 and delays, of the n-phase data trains, the most-delayed-phase data train DT#n-1 in a most-delayed-phase data delay circuit 512 by one period to supply the delayed data train to the variation point indication pulse generator 511. The variation point indication pulse generator 511 performs, for the n-phase data trains DT#0 ($\tau$) to DT#n-1 ($\tau$) inputted in parallel in the present cycle (t=$\tau$) and the most-delayed-phase data train DT#n-1 ($\tau$-1) in the preceding cycle (t=$\tau$-1), a logical EXCLUSIVE OR operation between those of the data trains which have adjacent phases to generate an n-series pulse (variation point pulse) indicative of the presence or absence of a signal variation and outputs the n-series pulse to a variation point encoder 513.

The variation point encoder 513 detects a data train with a signal variation from the n-series variation point pulse and outputs the phase identification number of the detected data train. If signal variations occur in a plurality of data trains, a plurality of phase identification numbers are generated. If signals variations are detected simultaneously in three or more data trains, however, it is judged that the signal variations have resulted from short-period noise and therefore the outputting of the phase identification numbers is suppressed.

The phase identification number is supplied to each of a delay circuit 514 and an optimum phase operation unit 515. The optimum phase operation unit 515 determines the identification number of the optimum phase based on the phase identification number in the present cycle, which is outputted from the variation point encoder 513, and on the phase identification number in the cycle one period before, which is outputted from the delay circuit 514, and outputs the determined identification number as optimum phase information S510. By thus determining the optimum phase identification number from the phase identification numbers and the number thereof (the number of the points at which signal variations have occurred) obtained from two cycles, it becomes possible to precisely determine the optimum phase even if the duty of an input signal to the bit synchronization circuit varies.

The integration unit 520 is composed of an individual phase data counting unit 521 and a valid data counting unit 522, to each of which the foregoing optimum phase information S510 is supplied, and of a phase identification number holding unit 523 connected to the individual phase data counting unit 521.

The individual phase data counting unit 521 is composed of n counters corresponding to the respective phase identification numbers of the n-phase data trains DT#0 to DT#n-1 and increments, in each cycle of the reference clock CL, the count value of the counter corresponding to the phase identification number indicated by the optimum phase information S510. When the count reaches a given value N, the individual phase data counting unit 521 outputs the identification number (phase identification number) of the counter to the phase identification number holding unit 523 and generates a reset signal RST1 for bringing each of the count values in the individual phase data counting unit 521 and the count value in the valid data counting unit 522 to zero. The phase identification number held by the phase identification number holding unit 523 is outputted as averaged phase information S520 to the switching control unit 530.

The valid data counting unit 522 has a counter for counting the number of times the optimum phase information S510 is inputted, i.e., the number of input bits of the burst data. If the count value in the counter reaches a given value K (where $N \leq K < n$ (N-1)), a reset signal RST2 for resetting each of the count values in the counter and in the individual phase data counting unit 521 is generated. During the period during which the mask signal M generated from the mask signal generator 54 is OFF, the individual phase data counting unit 521 and the valid data counting unit 522 have respective counting operations halted, while each of the count values is in a reset state. The individual phase data counting unit 521 and the valid data counting unit 522 perform the counting operations described above during the period during which the mask signal M is ON.

For the bit synchronization circuit 51 to establish instantaneous synchronization at the leading portion of each of the burst data sets, it is necessary minimize an averaging time in the integration unit 520. Once the synchronization has been established, however, it is desired to increase the averaging time in the integration unit 520 to a degree for the suppression of erroneous phase switching resulting from instantaneous noise.

In the preferred embodiment of the present invention, therefore, two types of count value parameters are prepared in the integration unit 520, which are N1 and N2 (where N1<N2) as count value parameter N, and K1 and K2 (where K1<K2) as count value parameter K. When the ATC is reset to an offset threshold TH0 during the period during which the guard time GT is received, high-speed establishment of synchronization is performed during the period during which the preamble PR is received by setting the N1 and K1 as the count value parameters, and the count value parameters N1 and K1 are then switched to the parameters N2 and K2 after the establishment of synchronization. This suppresses the noise-induced misoperation during the period during which the payload is received even if the burst data set is elongated so that requirements for high-speed establishment of synchronization and noise immunity are satisfied simultaneously.

The switching control unit 530 is composed of a phase comparator 531 and a phase holder 532. In each cycle of the reference clock, the phase comparator 531 outputs the phase identification number indicated by the averaged phase information S520 as the switching control signal SC. The phase comparator 531 compares, with the averaged phase information S520 outputted from the integration unit 520, the present phase information held by the present phase holder 532 in each cycle of the reference clock CL and causes, if there is a change in phase information (the identifier of the optimum phase), the present phase holder 532 to hold new phase information.

When the present phase information held in the present phase holder 532 indicates the most advanced phase (the phase of the data train DT#0) and the averaged phase information S520 indicates the most delayed phase (the phase of the data train DT#n-1) the phase comparator 531 generates an advanced-phase control signal SPa together with the switching control signal SC for switching to the most delayed phase. If the present phase information held in the present phase holder 532 indicates the most delayed phase and new phase information indicates the most advanced phase, the phase comparator 531 generates the delayed-phase control signal SPd instead of the advanced-phase control signal SPa.

The phase information held in the present phase holder 532 is cleared while the mask signal M is in the OFF state. When the mask signal is in the ON state, new phase information outputted from the integration unit 520 is held in the present phase holder 532. The phase comparator 531 suppresses the respective operations of generating the advanced-phase control signal SPa and the delayed-phase control signal SPd while the mask signal M is in the OFF state.

Figure 10:
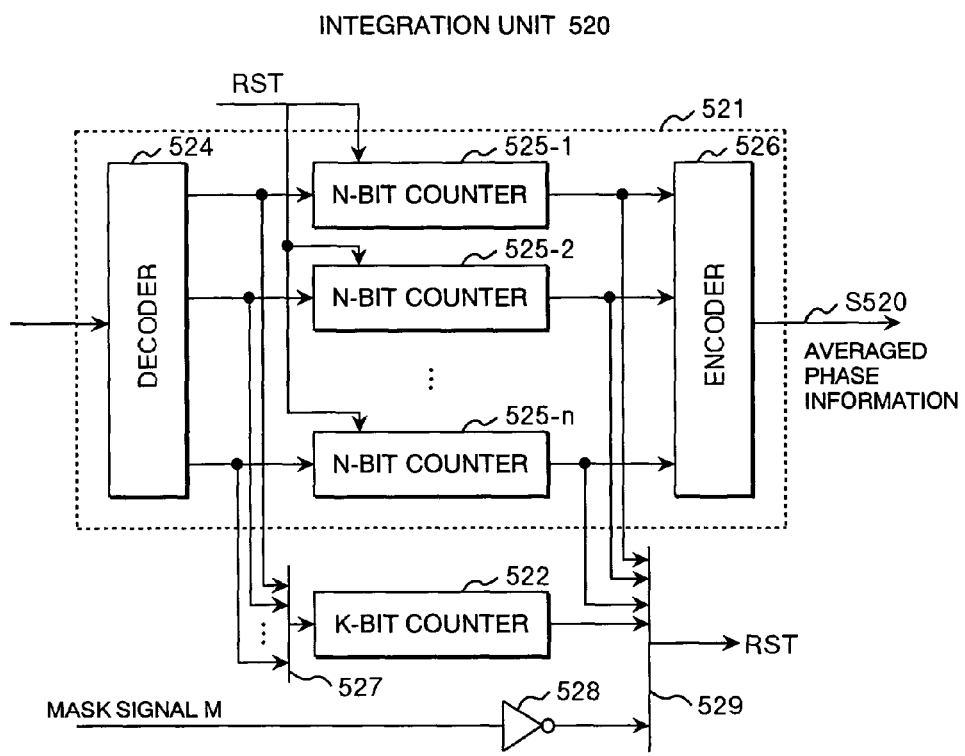
FIG. 10 is a view showing an embodiment of an integration unit 520 in the phase determination unit 51 shown in FIG. 9.

FIG. 10 shows another embodiment of the integration unit 520.

In the present embodiment, the individual phase data counting unit 521 is composed of n-series N-bit counters 525-1 to 525-n, a decoder 524 connected to these counters, and an encoder 526 also connected to these counters. The optimum phase information S510 is decoded by the decoder 524 and a count pulse is inputted to that one of the N-bit counters corresponding to the phase identifier indicated by the optimum phase information S510. If the count value in the N-bit counter 525-$j$, which is any one of the n-bit counters 525-1 to 525-$n$, reaches N as a result of a counting operation, the encoder 526 outputs the phase identifier corresponding to the N-bit counter 525-$j$ as the averaged phase information S520.

The valid data counting unit 522 is composed of a K-bit counter and an output pulse from the decoder 524 is inputted to the K-bit counter via an OR gate 527. It follows therefore that the K-bit counter counts the number of times the optimum phase information S510 is inputted. An output from the K-bit counter 522 and outputs from the N-bit counters 525-1 to 525-$n$ are inputted to an OR gate 529 so that an output from the OR gate 529 becomes a reset signal RST (RST1+RST2) for these counters. In the present embodiment, the mask signal M is inputted to the OR gate 529 via the inverter 528 such that the reset signal RST is generated when the mask signal M is in the OFF state, when the count value in the K-bit counter reaches K, or when the count value in any of the N-bit counters 525 reaches N.

Figure 11:
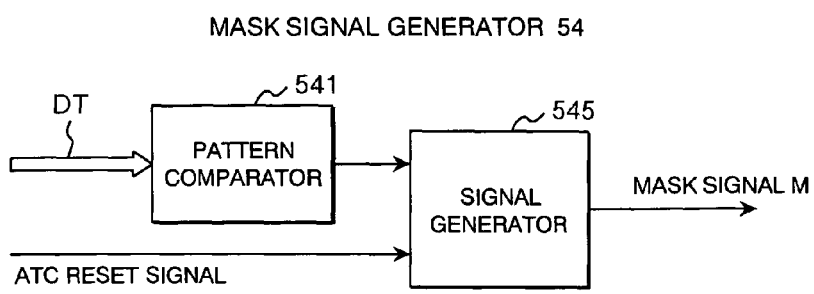
FIG. 11 is a view showing an embodiment of a mask signal generator 54 in the bit synchronization circuit shown in FIG. 1.
Figures 12A, 12B:
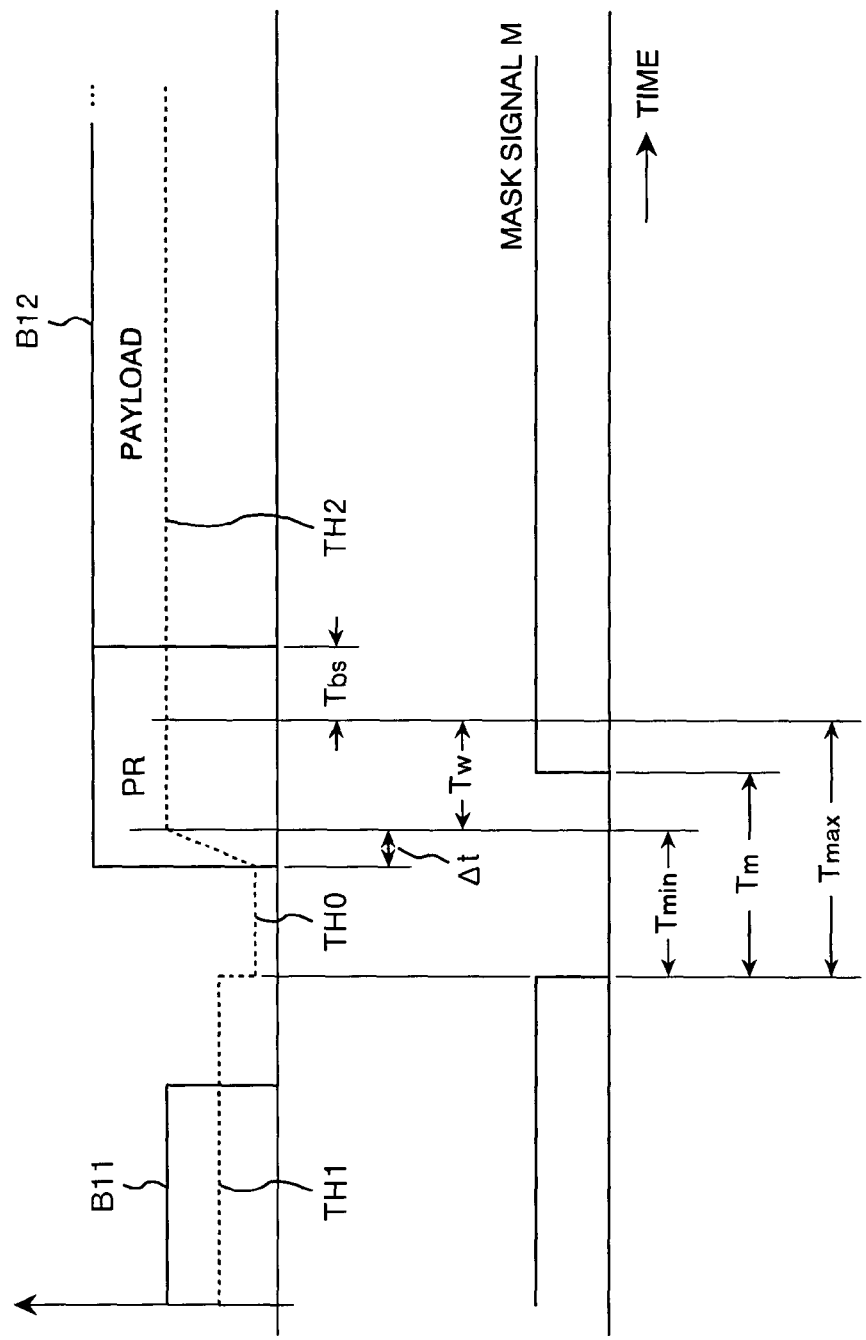
FIGS. 12A and 12B are views each showing a relationship between received data and a mask time segment Tm.

FIG. 11 shows a structure of the mask signal generator 54. FIGS. 12A and 12B show a relationship between received data and a mask time segment Tm. In the example shown herein, each burst data set contains the payload subsequent to a non-signal segment (guard time) and the preamble PR.

The mask signal is for suppressing a noise-induced misoperation during the period from the resetting of the ATC decision threshold to the offset threshold TH0 in the non-signal segment till the determination of the ATC decision threshold of the next burst data set.

In the example shown in FIG. 12, the minimum value Tmin of the mask segment Tm is the segment from the resetting of the ATC decision threshold to the offset value TH0 till the determination of the ATC decision threshold TH2 for the next burst data set B12 and the maximum value Tmax thereof corresponds to a period left between the resetting of the ATC decision threshold to the offset value TH0 and a period Tbs required to establish initial bit synchronization for the preamble PR of the next burst data set B12. Accordingly, the mask signal generator 54 identifies a preamble signal and terminates the mask segment Tm within a period Tw obtained by subtracting, from the length of the preamble, a period Δt required to determine the ATC decision threshold TH2 and the period Tbs required to establish bit synchronization.

As shown in FIG. 11, the mask signal generator 54 is composed of a pattern comparator 541 for comparing a preamble signal pattern with the n-phase data trains DT (DT#0 to TD#n-1) to generate a preamble (PR) detection signal and a signal generator 545 for bringing the mask signal M into the OFF state by using an ATC reset signal as a trigger and returning the mask signal M into the ON state in response to the preamble detection signal.

Figure 13:
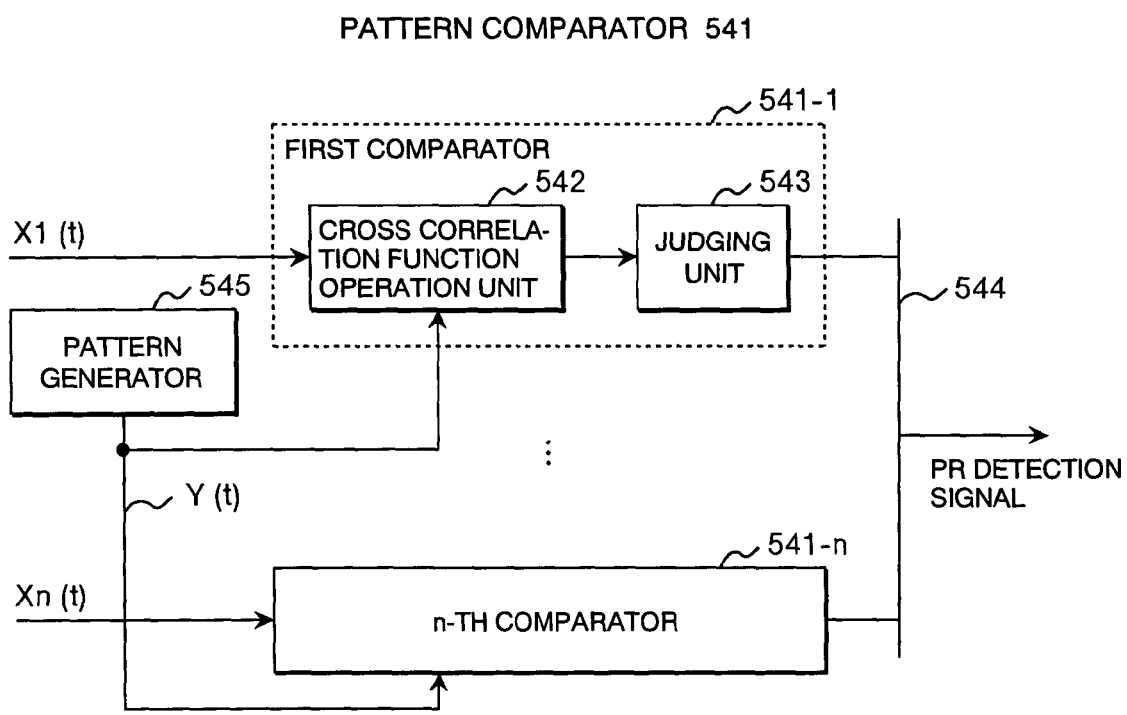
FIG. 13 is a view showing an embodiment of a pattern comparator 541 in the mask signal generator 54 shown in FIG. 11.

FIG. 13 shows an embodiment of the pattern comparator 541. The pattern comparator 541 is composed of: a plurality of comparators 541-1 to 541-$n$ corresponding to the data trains DT#0 to DT#n-1; an OR gate 544; and a generator 545 for the preamble pattern. The comparator 541-$i$ ($i$=1 to n), which is any one of the comparators 541-1 to 541-$n$, is composed of a cross correlation function operation unit 542 for performing a cross correlation function operation between the preamble pattern Y(t) supplied from the pattern generator 545 and input data Xi(t)=DT#i and a judging unit 543 connected to the cross correlation function operation unit 542. When the result of the operation by the cross correlation function operation unit 542 is "+1" or "−1", the judging unit 543 generates a pattern detection signal. Therefore, the preamble (PR) detection signal is generated from the OR gate 544 to the signal generator 545 when any of the comparators generates the pattern detection signal.

Although the pattern comparator 541 is composed of the n comparators 541-1 to 541-n corresponding to the data trains DT#0 to DT#n-1 herein, the number of the comparators may be smaller than the number n of phases. In the case where n=4, if two comparators are prepared, the data trains DT#0 and TD#2 are inputted to the first and second comparators, respectively, and the preamble pattern is detected by either of the comparators, the preamble (PR) detection signal may also be outputted from the OR gate 544.

The time (window width) required to detect the foregoing preamble pattern may be set appropriately within the segment Tw shown in FIG. 12. One feature of the present invention is that, at the time of generation of the preamble detection signal from the pattern comparator 541, the signal generator 545 returns the mask signal M into the ON state to initiate the operation of tracking the optimum phase.

In a bit synchronization circuit of optimum phase data selecting type, if the phase of a received signal (received data) is shifted from the phase of a reference clock by one period or more by a phase variation in the received data, the missing or overlapping of data (bit) occurs in the output data train upon the switching of the optimum phase data.

FIGS. 14A to 14F show the causes of the missing and overlapping of data if the frequency of the reference clock CL is f0, the frequency of the received signal (received data) is f1, and the number n of phases is 4.

Figure 14:
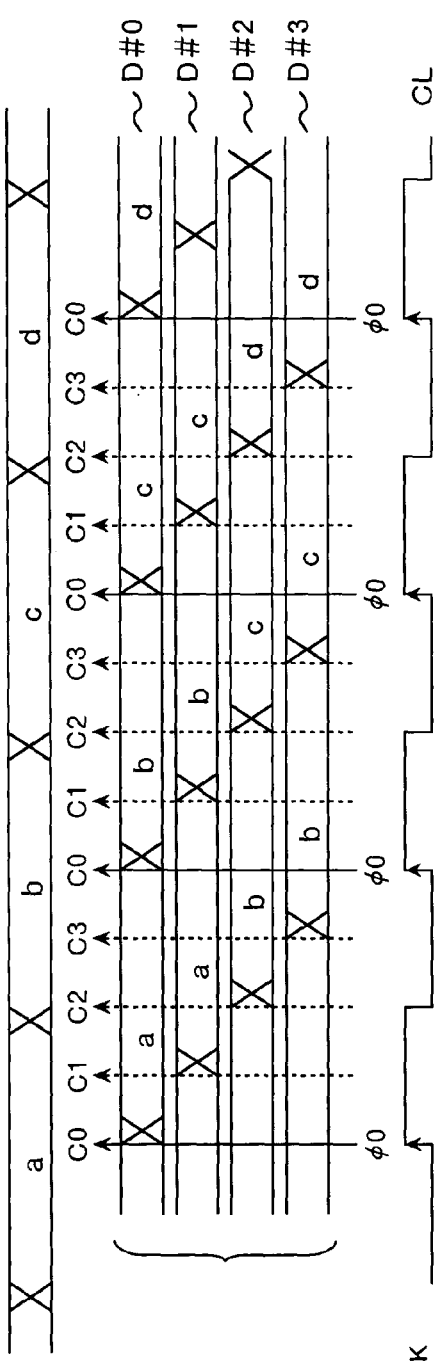
FIGS. 14A to 14F are views each for illustrating the causes of the missing and overlapping of data occurring upon the switching of optimum phase data.

In FIGS. 14A to 14F, FIG. 14A indicates the received data train, 14C indicates the reference clock CL, and FIG. 14B shows the data trains D#0, D#1, D#2, and D#3 obtained when the received data train is sampled with the timings of the respective rising edges of multiphase clocks C0, C1, C2, and C3 (where the clock C0 has the same phase as the reference clock CL) generated by stepwise shifting the phase of the reference clock CL by ¼ periods thereof in the multiphase data sampling unit 50.

FIG. 14D shows data trains DT#0, DT#1, DT#2, and DT#3 when the respective phases of the data trains D#0, D#1, D#2, and D#3 are matched with the phase φ0 of the reference clock. The data trains shown in FIG. 14D become n-phase data trains DT outputted from the multiphase data sampling unit 50. As is obvious from a comparison between the respective contents of the data trains DT#0 and DT#3, it will be understood that the content of the most-delayed-phase data train DT#3 is advanced by one period with respect to the content of the most-advanced-phase data train DT#0.

The missing of data occurs when the optimum phase is switched from the most advanced phase to the most delayed phase under the optimum phase data selecting control, while the relationship represented by f1>f0 is established between the frequencies, due to, e.g., a steady frequency deviation present between the central terminal and the remote terminal or a temporary frequency variation resulting from a jitter or wander. The fact that the most-advanced-phase data train is selected at the present point of time indicates that a variation point in received data exists adjacent the midpoint between the most-advanced-phase data train DT#0 and the most-delayed-phase data train DT#3. If the output data selector 55 switches the optimum phase data train from the most-advanced-phase data train DT#0 to the most-delayed-phase data train DT#3, which has an adjacent phase, in response to the switching control signal SC, a part (which is the data c in this example) of the data D1 outputted from the selector is missing, as shown in FIG. 14E.

The overlapping of data occurs when the optimum phase is switched from the most delayed phase to the most advanced phase, which is an adjacent phase, while the relationship represented by f1<f0 is established between the frequencies. That is, when the output data selector 55 performs switching from the most-delayed-phase data train DT#3 to the most-advanced-phase data train DT#0 in response to the switching control signal SC, a part (which is the data c in this example) of the data D1 outputted from the selector is overlapping, as shown in FIG. 14F.

In the present invention, the disturbance in data continuity, such as the occurrence of missing data or overlapping data described above is corrected by the missing data supplying unit 56 and the output data synchronization unit 60 (the data storage unit 57 and the data transfer control unit 58) shown in FIG. 1.

Figure 15:
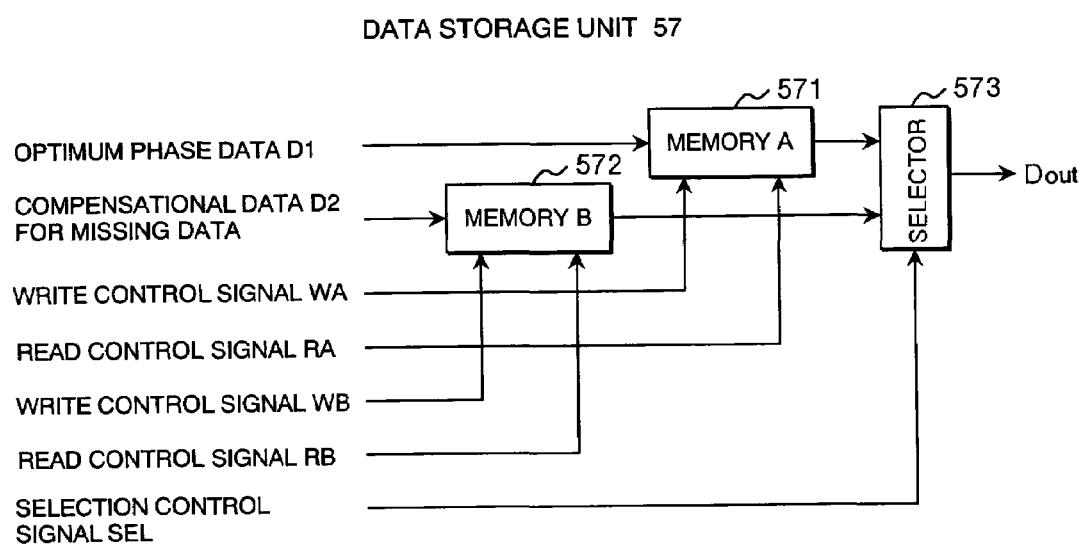
FIG. 15 is a view showing an embodiment of a data storage unit 57 in the bit synchronization circuit shown in FIG. 1.

FIG. 15 shows an embodiment of the data storage unit 57. The data storage unit 57 is composed of: a memory 571 for temporarily storing a part of the optimum phase data train D1 supplied from the output data selector 55; a memory 572 for temporarily storing a part of the compensatory data train D2 for missing data supplied from the missing data supplying unit 56; and a selector 573 for selectively outputting data read out from these memories.

The writing and reading of the data D1 in and from the memory 571 is controlled with a write control signal WA and a read control signal RA. The writing and reading of the data D2 in and from the memory 572 is controlled with a write control signal WB and a read control signal RB. The selection of data by the selector 573 is controlled with a selection control signal SEL. These control signals are supplied from the data transfer control unit 58, which will be described later with reference to FIG. 17.

Figure 16A:
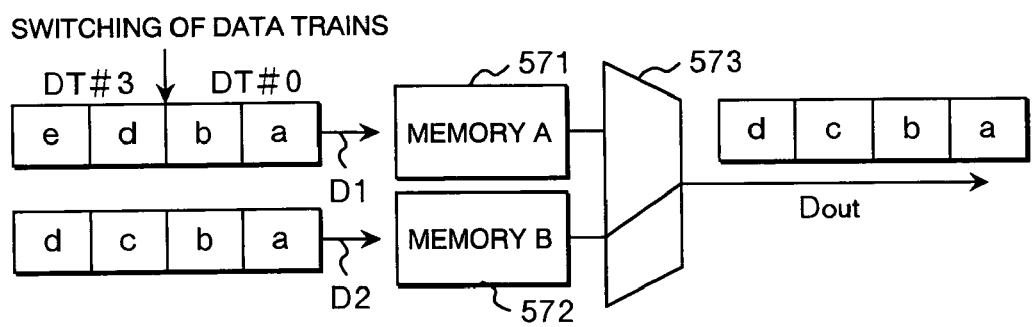
FIGS. 16A and 16B are diagrams each schematically showing the function of the data storage unit 57.
Figure 16B:
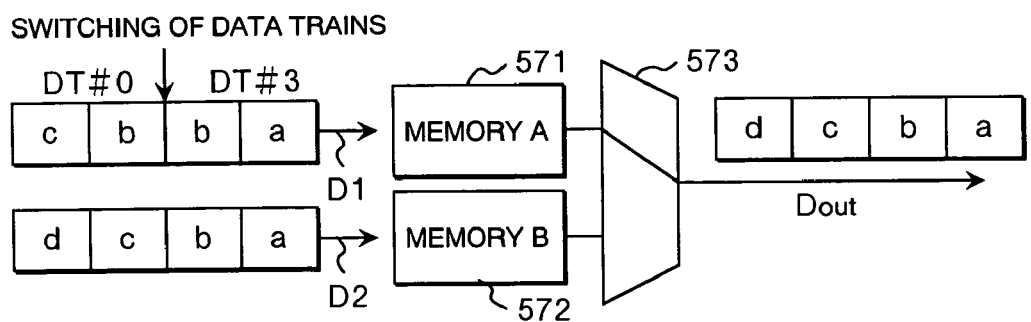

FIGS. 16A and 16B are diagrams each schematically showing the function of the data storage unit 57.

FIG. 16A shows, in association with FIGS. 14A to 14F, the optimum phase data train D1 and the compensatory data train D2 for missing data before and after the switching from the most-advanced-phase data train DT#0 to the most-delayed-phase data train DT#3 by the output data selector 55. Although the content of the most-delayed-phase data train DT#3 is advanced by one period with respect to the content of the most-advanced-phase data train DT#0 in FIGS. 14A to 14F, the compensatory data train D2 for missing data and the optimum phase data train D1 are supplied in synchronized relation to the memories 571 and 572 with the most-delayed-phase data train DT#3 being delayed by a specified time and then outputted by the missing data supplying unit 56.

When the output data selector 55 performs switching from the most-advanced-phase data train DT#0 to the most-delayed-phase data train DT#3 in response to the switching control signal SC, the data c misses from the optimum phase data train D1 supplied to the memory 571. To prevent this, the present invention performs read disable control for suppressing for one period the reading of data from the memory 571 according to the read control signal RA at the timing when the data (data d, in this example) immediately after the switching from the most-advanced-phase data train DT#0 to the most-delayed-phase data train DT#3 is read out from the memory 571.

During the period during which the reading of data from the memory 571 is suppressed, the selector 573 is caused to output compensatory data c for missing data read out from the memory 572 as the output data Dout, by using the selection control signal SEL. When the reading out of the compensatory data c for missing data is completed, data to be read out subsequently from the memory 571 coincides with data to be read out subsequently from the memory 572. By switching the data selected by the selector 573 to the data in the memory 571 and returning the operation of reading data from the memory 571 to the normal state with the use of the selection control signal SEL, the data d read out from the memory 571 and the optimum phase data trains subsequent to the data d are provided as the output data Dout.

FIG. 16B shows the optimum phase data train D1 and the compensatory data train D2 for missing data before and after the switching from the most-delayed-phase data train DT#3 to the most-advanced-phase data train DT#0. In this case, the data b immediately after the phase switching is overlapping the data b immediately before the switching in the optimum phase data train D1 supplied to the memory 571.

To prevent this, the present invention performs write disable control for suppressing the writing of the optimum phase data train D1 in the memory 571 for one period by using the write control signal WA at the timing when the input data b immediately after the phase switching is written in the memory 571. By the write disable control, the optimum phase data train from which the overlapping data b has been deleted is written in the memory 571. This allows the normal output data train Dout to be read out from the memory 571.

When overlapping data has occurred, a shift corresponding to one period occurs in respective timings with which data sets in mutually corresponding relation are written between the optimum phase data train D1 inputted to the memory 571 and the compensatory data train D2 for missing data inputted to the memory 572. However, there should be no influence on the output data Dout, in the same manner as in the case shown in FIG. 16A, if data corresponding to a plurality of cycles is stored in each of the memories 571 and 572 and the written data is read out after several periods of delay.

Figure 17:
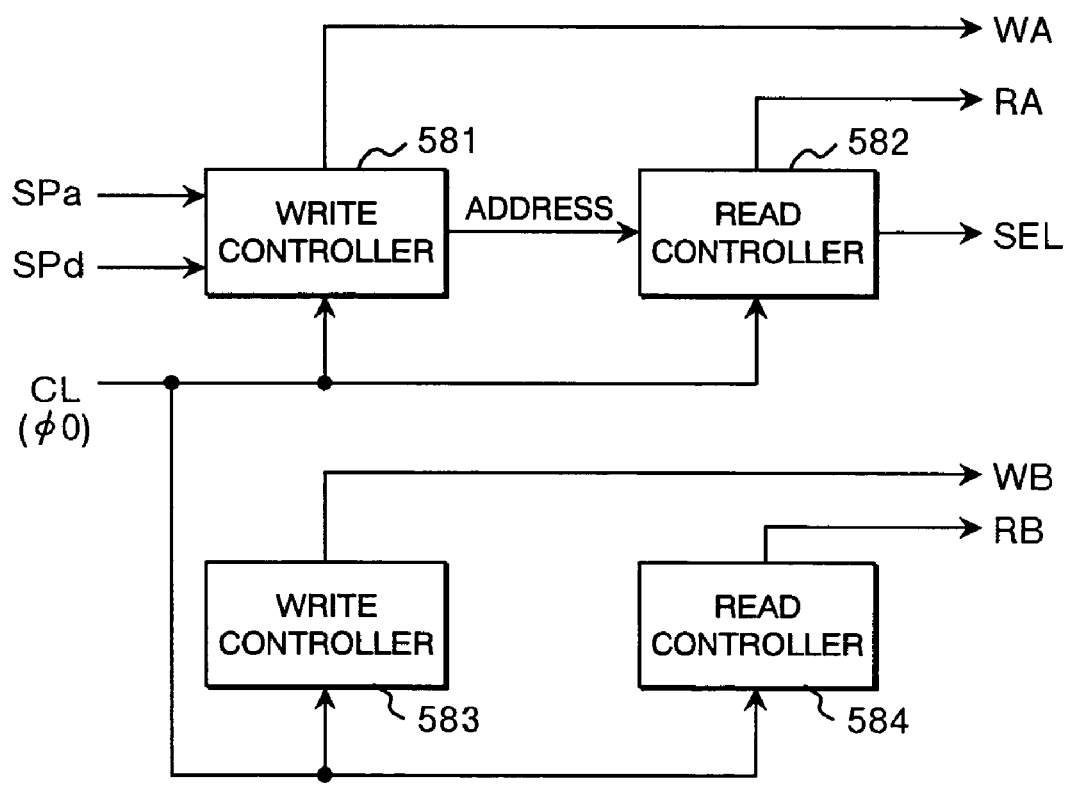
FIG. 17 is a view showing an embodiment of a data transfer control unit 58 in the bit synchronization circuit shown in FIG. 1.

FIG. 17 shows an embodiment of the data transfer control unit 58. The data transfer control unit 58 is composed of: a first write controller 581 for generating the write control signal WA; a first read controller 582 for generating the read control signal RA and the selection control signal SEL; a second write controller 583 for generating the write control signal WB; and a second read controller 584 for generating the read control signal RB. These controllers generate the respective control signals in synchronization with the reference clock CL ($\phi$0).

As described before, the phase determination unit 51 generates the advanced-phase control signal SPa upon the switching from the most-advanced-phase data train DT#0 to the most-delayed-phase data train DT#3 (upon the occurrence of missing data) and generates the delayed-phase control signal SPd upon the switching from the most-delayed-phase data train DT#3 to the most-advanced-phase data train DT#0 (upon the occurrence of overlapping data). The advanced-phase control signal SPa and the delayed-phase control signal SPd have been inputted to the first write controller 581.

The first write controller 581 generates a circulative write address in synchronization with the reference clock CL and outputs the generated circulative write address as the write control signal WA such that the data train D1 is stored by circulatively using the memory region of the memory 571. When the advanced-phase control signal SPa is inputted, the first write controller 581 notifies the first read controller 582 of a data write address (the address at which the data d is written in FIG. 16A) at that point of time and gives an instruction to execute the read disable control upon reading the data from the address. When the delayed-phase control signal SPd is inputted, the data write disable control is performed for one period with respect to the memory 571 to discard the overlapping data (which is the data b in FIG. 16B) and then the normal mode for generating the write control signal WA is restored.

The first read controller 582 circulatively generates a read address in synchronization with the reference clock CL and outputs the generated read address as the read control signal RA such that received data is read out through circulative access to the memory region of the memory 571, similarly to the first write controller 581. If the next read address coincides with the write address of which the first read controller 582 is notified by the first write controller 581, the first read controller 582 switches the selection control signal SEL for the selector 573, performs the data read disable control for one period with respect to the memory 571, restores the selection control signal SEL to the original state in the subsequent cycle, and outputs the read address coincident with the foregoing write address as the read control signal RA.

The second write controller 583 circulatively generates a write address in synchronization with the reference clock CL and outputs the generated write address as the write control signal WB such that the data train D2 is stored by circulatively using the memory region of the memory 572, similarly to the first write controller 581. The second read controller 584 circulatively generates a read address in synchronization with the reference clock CL and outputs the generated read address as the read control signal RB such that received data is read out through circulative access to the memory region of the memory 572, similarly to the first read controller 582.

According to the foregoing embodiments, it becomes possible to perform phase tracking during the period during which the burst data is received. Even if a phase variation or asynchronization between the received data and the reference clock occurs during the reception of the burst data, dynamic switching to a data train having an optimum phase for the reference clock can be performed by the output data selector. Even if a disturbance occurs in data continuity in the output from the output data selector by switching the optimum phase has been switched from the most advanced phase to the most delayed phase or from the most delayed phase to the most advanced phase, normal synchronized burst data with ensured continuity can be obtained through the correction of the disturbance by the output data synchronization unit.

As is obvious from the foregoing description, the present invention can provide a bit synchronization circuit capable of flexibly tracking the optimum phase during the reception of the burst data and therefore suitable for use in the G-PON system in which the burst data is elongated and varied.

We claim:

1. A bit synchronization circuit for synchronizing, with an internal reference clock, burst data sets received in time series order, the circuit comprising:
   a multiphase data sampling unit for converting each of the received burst data sets to multiphase data trains having phases different from each other;
   a phase determination unit for detecting, from among said multiphase data trains, an optimum phase data train having the highest phase margin over the reference clock and generating a control signal indicating the optimum phase data train;
   an output data selector for selectively passing, of the multiphase data trains outputted from said data sampling portion, the optimum phase data train indicated by said control signal;

a data synchronization unit for converting the data train passed through said output data selector to a data train in synchronization with said reference clock and outputting the resulting data train;

wherein said phase determination unit repeatedly performs the operation of detecting said optimum phase data train during a period during which the same burst data set is received and, if an optimum phase varies, said output data selector dynamically switches the optimum phase data to be supplied to said data synchronization unit in response to the control signal outputted from said phase determination unit; and means for generating a missing data supplying data train from the most-delayed-phase data train outputted from said multiphase data sampling unit and supplying, to said data synchronization unit, said missing data supplying data train in parallel relation with said optimum phase data train, wherein:

said phase determination unit has means for detecting a phase variation under a specified condition which disturbs continuity of the optimum phase data and generating a data train correction signal, and said data synchronization unit is provided with data transfer control means for selecting, in response to said data train correction signal, data to be transferred as the output data train from between said optimum phase data train and said missing data supplying data train.

2. The bit synchronization circuit according to claim 1, wherein:

said means for generating the data train correction signal detects that the optimum phase has changed from a most delayed phase to a most advanced phase to generate a first control signal as said data train correction signal and detects that the optimum phase has changed from the most advanced phase to the most delayed phase to generate a second control signal as said data train correction signal, and said data transfer control means deletes, from said optimum phase data train, data supplied upon the generation of said first control signal and performs an operation of selecting said data such that missing data supplying data supplied upon the generation of said second control signal is inserted compensatorily immediately before the optimum phase data supplied upon the generation of said second control signal.

3. The bit synchronization circuit according to claim 2, wherein:

said data synchronization unit has a first memory for storing a part of said optimum phase data train, a second memory for storing a part of said missing data supplying data train, and a selector for selectively outputting data read from said first and second memories as said output data train, and said data transfer control means dynamically controls said selector and writing and reading of data to and from said first and second memories in response to said first and second control signals.

4. A central terminal for an optical transmission system for communicating with a plurality of remote terminals, said central terminal having at least one subscriber line interface connected to an optical fiber for receiving burst data sets in time series order transmitted from the remote terminals in time division multiplex, said optical fiber accommodating the plurality of remote terminals via a plurality of tributary optical fibers branched from the optical fiber with an optical coupler, said subscriber line interface including an optical/electric signal converter for converting an optical signal received from said optical fiber to an electric signal, and a bit synchronization circuit connected to said optical/electric signal converter for synchronizing, with an internal reference clock, burst data sets supplied in an electric signal outputted from said optical/electric signal converter in time series order, said bit synchronization circuit comprising:

a multiphase data sampling unit for converting each of the received burst data sets to multiphase data trains having phases different from each other;

a phase determination unit for detecting, from among said multiphase data trains, an optimum phase data train having the highest phase margin over the reference clock and generating a control signal indicating the optimum phase data train;

an output data selector for selectively passing, of the multiphase data trains outputted from said data sampling portion, the optimum phase data train indicated by said control signal; and a data synchronization unit for converting the data train passed through said output data selector to a data train in synchronization with said reference clock and outputting the resulting data train, wherein;

said phase determination unit repeatedly performs the operation of detecting said optimum phase data train during a period during which the same burst data set is received and, if an optimum phase varies, said output data selector dynamically switches the optimum phase data to be supplied to said data synchronization unit in response to the control signal outputted from said phase determination unit, said optical/electric signal converter has an automatic threshold control (ATC) function of setting a variable threshold for identifying the optical signal for each of received burst data sets, resetting said threshold to an offset value within a no-signal segment generated between the individual burst data sets, and awaiting the optical signal for the subsequent burst data set, said bit synchronization circuit has means for generating a mask signal for initiating a mask period in response to a threshold reset signal supplied from said optical/electric signal converter and terminating the mask period after the variable threshold for identifying the optical signal for the subsequent burst data set is determined, and said phase determination unit has first means for detecting the optimum phase data train in each cycle of said reference clock, and second means for cumulatively summing the number of times the optimum phase data train is detected by said first means for each of the different phases and generating, regarding the phase for which the cumulative sum reaches a reference value as the optimum phase, a control signal indicating said optimum phase data train, said second means clearing the number of detections for each of the different phases on every determination of the optimum phase, repeating the cumulative summation of the number of detections for each of the different phases, and maintaining, during the mask period indicated by said mask signal, a state in which the number of detections is cleared while halting the operation of cumulative summation of the number of detections.

* * * * *